(12) United States Patent
Dinger et al.

(10) Patent No.: US 10,281,019 B2
(45) Date of Patent: May 7, 2019

(54) DEVICE FOR TRANSMITTING TORQUE

(71) Applicant: Schaeffler Technologies AG & Co. KG, Herzogenaurach (DE)

(72) Inventors: Christian Dinger, Lauf (DE); Jan Hoffmann, Rastatt (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/039,509

(22) PCT Filed: Nov. 28, 2014

(86) PCT No.: PCT/DE2014/200669
§ 371 (c)(1),
(2) Date: May 26, 2016

(87) PCT Pub. No.: WO2015/081953
PCT Pub. Date: Jun. 11, 2015

(65) Prior Publication Data
US 2017/0030451 A1 Feb. 2, 2017

(30) Foreign Application Priority Data

Dec. 2, 2013 (DE) .................. 10 2013 224 670

(51) Int. Cl.
*F16H 45/02* (2006.01)
*F16D 13/40* (2006.01)
*F16F 15/14* (2006.01)

(52) U.S. Cl.
CPC ............. *F16H 45/02* (2013.01); *F16D 13/40* (2013.01); *F16F 15/145* (2013.01);
(Continued)

(58) Field of Classification Search
CPC ............. F16H 45/02; F16H 2045/0226; F16H 2045/0257; F16H 2045/0263; F16H 2045/0278; F16D 13/40; F16F 15/145
See application file for complete search history.

(56) References Cited

U.S. PATENT DOCUMENTS 7,445,099 B2 11/2008 Maucher et al.
8,161,739 B2 * 4/2012 Degler ................. F16F 15/145
192/30 V
(Continued)

FOREIGN PATENT DOCUMENTS

CN 1662752 A 8/2005
CN 102575755 B 7/2015
(Continued)

OTHER PUBLICATIONS

Chinese Office Action for CN 105793617 A; 7 pgs; dated Sep. 20, 2017 by China Patent Department.
(Continued)

*Primary Examiner* — Jacob S. Scott
*Assistant Examiner* — Tinh Dang
(74) *Attorney, Agent, or Firm* — LeKeisha M. Suggs

(57) ABSTRACT

A device for transmitting torque between an input side and an output side includes a hydrodynamic converter having a pump wheel that is connected to the input side and a turbine wheel that is coupled with the pump wheel hydrodynamically by a fluid, as well as a spring damper for coupling the turbine wheel with the output side and a centrifugal pendulum that is joined with one of the other elements in a torque-locked connection. In this case, only one spring damper is disposed in the flow of torque between the input side and the output side.

9 Claims, 4 Drawing Sheets

(52) U.S. Cl.
CPC ............... *F16H 2045/0226* (2013.01); *F16H 2045/0257* (2013.01); *F16H 2045/0263* (2013.01); *F16H 2045/0278* (2013.01)

(56) References Cited

U.S. PATENT DOCUMENTS

| | | | | |
|---|---|---|---|---|
| 8,161,740 | B2* | 4/2012 | Krause | F16F 15/145 |
| | | | | 192/30 V |
| 8,397,886 | B2 | 3/2013 | Kombowski et al. | |
| 8,573,374 | B2* | 11/2013 | Magerkurth | F16F 15/145 |
| | | | | 192/213.1 |
| 8,640,449 | B2 | 2/2014 | Huegel et al. | |
| 8,807,310 | B2* | 8/2014 | Takikawa | F16H 45/02 |
| | | | | 192/213.1 |
| 9,416,860 | B2* | 8/2016 | Amano | F16F 15/145 |
| 2002/0073701 | A1 | 6/2002 | Bornschier et al. | |
| 2009/0014269 | A1 | 1/2009 | Ari et al. | |
| 2010/0269497 | A1 | 10/2010 | Engelmann | |
| 2011/0314957 | A1* | 12/2011 | Krause | F16F 15/121 |
| | | | | 74/574.2 |
| 2012/0043173 | A1 | 2/2012 | Jameson et al. | |
| 2012/0111684 | A1 | 5/2012 | Kombowski et al. | |
| 2014/0097055 | A1 | 4/2014 | Lindemann et al. | |
| 2016/0146324 | A1* | 5/2016 | Lindemann | F16H 45/02 |
| | | | | 192/3.28 |
| 2016/0215851 | A1* | 7/2016 | Maienschein | F16F 15/145 |
| 2018/0291990 | A1* | 10/2018 | Hess | F16H 45/02 |

FOREIGN PATENT DOCUMENTS

| | | |
|---|---|---|
| DE | 102010025582 | 1/2011 |
| DE | 102010035124 | 3/2011 |
| DE | 102012219965 | 5/2013 |
| WO | 2012043302 A1 | 4/2012 |
| WO | WO2014/053388 | 4/2014 |

OTHER PUBLICATIONS

Chinese Office Action for Chinese Application No. CN201480065866.9, dated Jun. 5, 2018, 6 Pages.
Chinese Search Report for Chinese Application No. CN201480065866.9, dated Sep. 9, 2017, 1 Page.

* cited by examiner

DEVICE FOR TRANSMITTING TORQUE

The invention relates to a device for transmitting torque. In particular, the invention relates to an integrated hydrodynamic converter clutch for use in a drivetrain of a motor vehicle.

BACKGROUND

In a drivetrain of a motor vehicle, a device for transmitting torque is used between a drive motor and a gear unit, in order on the one hand to be able to control the flow of torque between the drive motor and the transmission, in particular by producing or interrupting the flow, and on the other hand to damp or cancel non-uniformities in the rotary motion. In one variant, a hydrodynamic torque converter is used to transmit the torque. The hydrodynamic converter comprises a pump wheel and a turbine wheel, which are coupled with each other hydrodynamically by means of a fluid. The level of a torque transmitted by the converter can be dependent on a difference between the rotational speeds of the pump wheel and the turbine wheel. The hydrodynamic converter makes it possible to prevent the drive motor of the motor vehicle from stopping when the rotational speed in the gear unit drops to zero. The drive motor may comprise an internal combustion engine, in particular a reciprocating engine.

A non-uniformity of the rotary motion of the input side or output side of the named device may be reduced or insulated between the input and the output side by means of different known elements. For example, a centrifugal pendulum may be connected to a rotating element of the device. The centrifugal pendulum includes a pendulum flange, to which a pendulum mass is movably attached in the plane of rotation. If the rotary motion of the pendulum flange is accelerated or retarded, the pendulum mass is deflected radially inward or radially outward, which enables energy to be absorbed or released, so that the acceleration or retardation of the rotary motion is counteracted. The centrifugal pendulum may be employed in particular to eliminate torsional vibrations.

SUMMARY OF THE INVENTION

It is an object of the present invention to provide an improved integrated device for transmitting torque. A device according to the invention for transmitting torque between an input side and an output side comprises a hydrodynamic converter having a pump wheel that is connected to the input side and a turbine wheel that is coupled with the pump wheel hydrodynamically by means of a fluid, as well as a spring damper for coupling the turbine wheel with the output side and a centrifugal pendulum that is joined with one of the other elements in a torque-locked connection. In this case, only one spring damper is disposed in the flow of torque between the input side and the output side.

By providing only one spring damper, it is possible to design the device compactly and efficiently. The integrated device is able to make good use of existing construction space and can be used for different applications, in particular in drivetrains of different motor vehicles. Complexity of the device can be low, so that high reliability or a long service life may be achieved.

In one embodiment, the centrifugal pendulum is rigidly connected to the output side. In this embodiment, the torque passes from the input side first through the hydrodynamic converter and then through the spring damper, before it reaches the pendulum flange. This enables the pendulum flange to contribute to canceling out vibrations that are due to the spring damper. Furthermore, compact construction of the device for transmitting torque can be supported.

In another embodiment, the device includes a housing to receive the turbine wheel, the spring damper, the centrifugal pendulum and the fluid. In this way, the fluid may also be used for lubricating, cleansing or cooling the centrifugal pendulum or the spring damper, besides hydraulically coupling the pump wheel with the turbine wheel. The elements of the device can be better encapsulated by means of the housing, which may enable improved manageability of the device.

In one embodiment, the spring damper comprises a bow spring. The bow spring extends along a circumference around an axis of rotation, and compared to a spring damper having a straight spring it can allow a significantly greater torsional angle between its input side and its output side.

For the bow spring, a radially outer holding element can be provided, which is mounted so that it can rotate relative to the turbine wheel and the output side. The bow spring can be braced on the radial output side by means of the holding element, in which case a desired damping effect can occur due to an increased radial contact force, in particular at high rotational speeds. Because of the free mounting of the holding element relative to the turbine wheel and the output side, the holding element is better able to follow the movements of the bow spring. This allows spring properties of the bow spring to be better utilized.

In one variant, the spring damper is positioned radially inside a pendulum mass of the centrifugal pendulum. This enables the spring damper in particular to nestle into a radially inner area of the hydrodynamic converter. Existing construction space can be better utilized as a result.

In a different variant, the spring damper is positioned radially outside of the pendulum mass of the centrifugal pendulum. In this case, the spring damper can nestle into a radially outer area of the hydrodynamic converter, enabling good utilization of existing construction space in this variant too.

In another preferred embodiment, the pendulum flange and the spring damper align with each other axially. This can simplify a transmission of force from the spring damper through the pendulum flange to the output side.

Preferably, a controllable friction clutch is also provided to rigidly couple the pump wheel with the turbine wheel. If the rotational speeds of the pump wheel and the turbine wheel differ from each other only slightly, then the efficiency of the entire device for transmitting torque can be increased by engaging the friction clutch.

BRIEF DESCRIPTION OF THE DRAWINGS

The invention will now be described in greater detail by reference to the accompanying figures, in which the figures represent the following.

DETAILED DESCRIPTION

Figure 1:
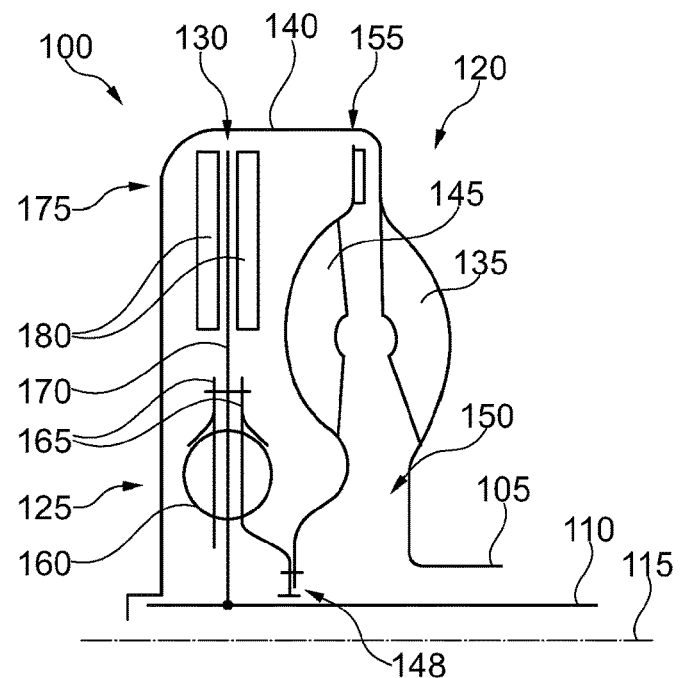
FIGS. 1 through 8 schematic depictions of different embodiments of devices for transmitting torque, each showing exactly one spring damper in the power stream between an input side and an output side.

FIG. 1 shows a device 100 for transmitting torque between an input side 105 and an output side 110 in a first embodiment. Here, a transmission of force is not limited to the direction from the input side 105 to the output side 110; rather, a transmission of torque in the opposite direction may also occur. The assignment of the terms input side and output side may also be exchanged in this sense.

The input side 105 and the output side 110 are mounted rotatably about a common axis of rotation 115. The device 100 includes a hydrodynamic converter 120, a spring damper 125 and a centrifugal pendulum 130. The hydrodynamic converter 120 includes a pump wheel 135, which is connected rigidly to the input side 105. In the depicted, preferred embodiment, the pump wheel 135 is attached to a housing 140 or integrated with it, the housing 140 being set up to receive the rest of the components, in particular the spring damper 125 and the centrifugal pendulum 130. In a different embodiment, the housing 140 may also accommodate only the pump wheel 135 and the turbine wheel 145. A turbine wheel 145 of the hydrodynamic converter 120 can be coupled hydrodynamically with the turbine wheel 145 by means of a hydraulic fluid 150. The fluid 150 is able to cause a transmission of torque by flowing between the pump wheel 135 and the turbine wheel 145. Furthermore, the fluid 150 may flow around or through the spring damper 125 or the centrifugal pendulum 130, enabling a cooling effect, a cleansing effect or a lubricating effect. In a preferred embodiment, a controllable friction clutch 155 is also provided to rigidly couple the pump wheel 135 with the turbine wheel 145. The turbine wheel 145 is preferably braced radially on its radial inner side in relation to the output side 110 by means of a hub 148, a sleeve or some other device.

The spring damper 125 includes an elastic element 160, which is disposed around the axis of rotation 115 in the area of a circumference. In the depicted embodiment, the elastic element 160 comprises a cylindrical coil spring, which rests at a first axial end against an intermediate flange 165 that is rigidly coupled with the turbine wheel 145 and at the opposite axial end against a pendulum flange 170 of the centrifugal pendulum 130. In a different embodiment, the elastic element 160 may also comprise a bow spring, which follows the circumference around the axis of rotation 115. If the pendulum flange 170 is rotated relative to the intermediate flange 165 in or opposite the direction of rotation of the pendulum flange 170, then the elastic element 160 is compressed. In the depicted embodiment there are two instances of the intermediate flange 165, there being an intermediate flange 165 on each axial side of the pendulum flange 170. The two intermediate flanges 165 are rigidly joined with each other, for example by means of a riveted connection. Preferably, to brace the elastic element 160 radially on the radially outer side, a holding element 305 is formed on at least one of the intermediate flanges 165.

The centrifugal pendulum 130 also includes a pendulum mass 175, which is formed in the present embodiment by two pendulum elements 180 which are located on different axial sides of the pendulum flange 170 and are rigidly joined with each other. The pendulum mass 175 is movably attached to the pendulum flange 170 around the axis of rotation 115 in the plane of rotation.

In the embodiment depicted in FIG. 1, the spring damper 125 is located radially inside the pendulum mass 175 of the centrifugal pendulum 130. The pendulum flange 170 and the spring damper 125 are preferably aligned with each other axially in this case, so that the pendulum flange 170 can be extended in the plane of rotation.

The embodiments of devices 100 for transmitting torque described below in reference to FIGS. 2 through 8 use elements that were already described in reference to FIG. 1. Where not specified otherwise, variant possibilities or details may be adopted accordingly. As a general principle, features of the embodiments depicted in FIGS. 1 through 8 may be combined with each other. Only the deviating construction features of additional embodiments of the device 100 will be described in greater detail below.

Figure 2:
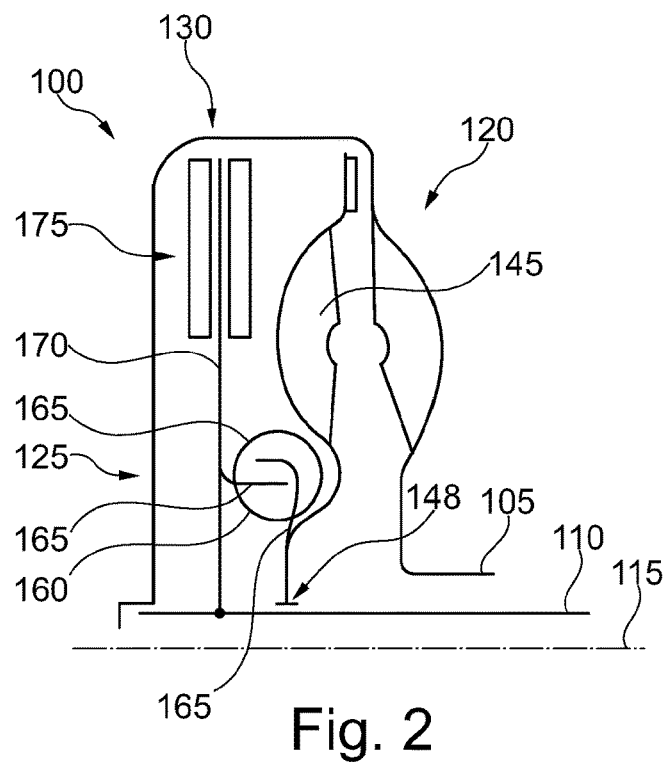

FIG. 2 shows a device 100 in a second embodiment. Here, the pendulum flange 170 is likewise straight in the radial direction, but there is an axial offset between the spring damper 125 and the pendulum mass 175 of the pendulum flange 170. A first axial contact area for the elastic element 160 of the spring damper 125 can be bent axially out of the pendulum flange 170 as an auxiliary flange 165. A second axial contact element for the elastic element 160 is preferably formed by an auxiliary flange 165 that is rigidly connected to the turbine wheel 145 of the hydrodynamic converter 120 radially inside the elastic element 160. An additional auxiliary flange 165 may be provided for radially outer bracing of the elastic element 160. The auxiliary flanges 165 are preferably riveted to each other or designed together as a single piece. The spring damper 125 preferably nestles in a radially inner area of the hydrodynamic damper 120, axially between the pendulum flange 170 and the turbine wheel 145.

Figure 3:
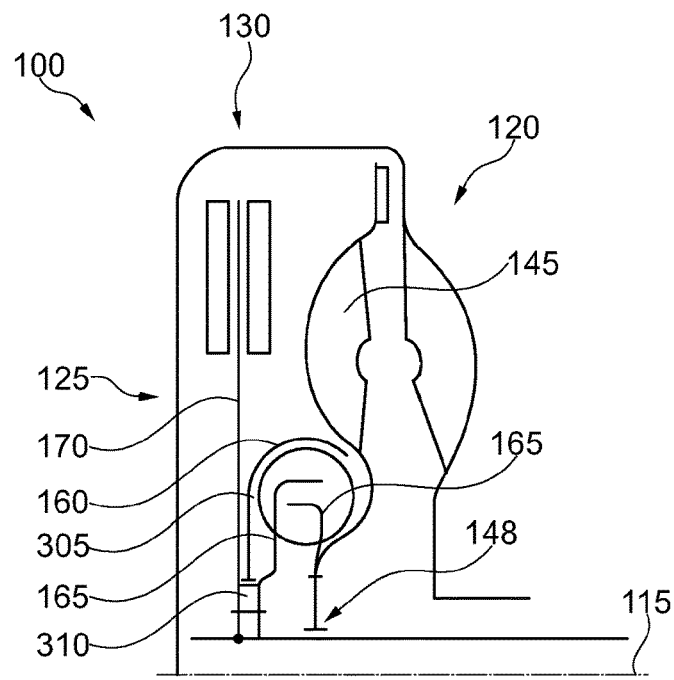

FIG. 3 shows the device 100 in a third embodiment. In contrast to the embodiment depicted in FIG. 2, here a holding element 305 is provided for the radially outer bracing of the elastic element 160, which is rotatable around the axis of rotation 115. In particular, the holding element 305 is attached neither to the pendulum flange 170 nor to the turbine wheel 145, nor to an auxiliary flange 165 connected to it. In the radial direction, the holding element 305 is preferably braced relative to the pendulum flange 170 or to a hub 310 connected to it. Instead of the hub 310, a sleeve, a bearing or some other device may also be provided.

Figure 4:
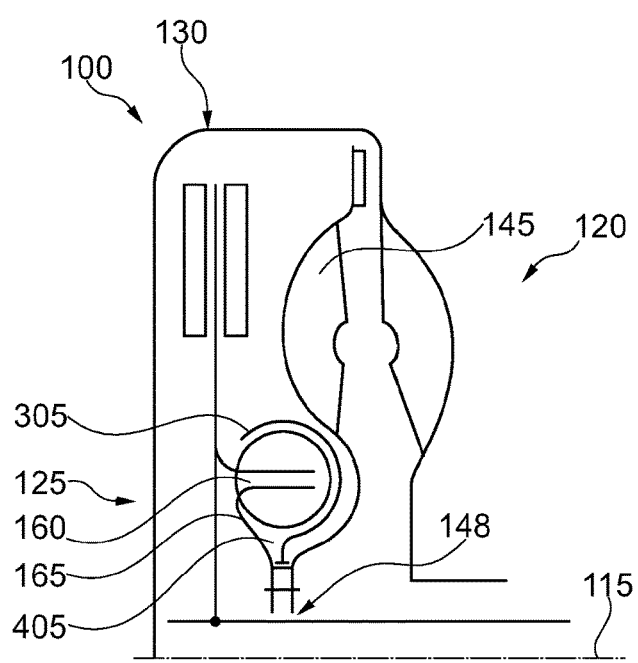

FIG. 4 shows the device 100 in a fourth embodiment. Here an additional hub 405 is provided in order to brace the holding element 305 radially, the hub 405 being designed so that it aligns axially with the elastic element 160. In place of the hub 405, a sleeve, a bearing or some other device may also be used. The auxiliary flange 165 for axial contact with the elastic element 160 and a radially inner section of the turbine wheel 145 are in contact with the hub 310 on different axial sides and are preferably connected to it frictionally.

Figure 5:
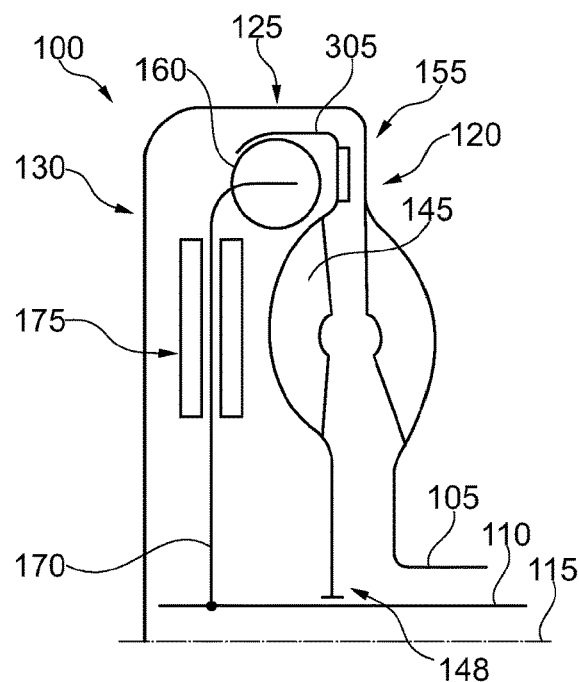

FIG. 5 shows the device 100 in a fifth embodiment. Here, the spring damper 125 is located radially outside of the pendulum mass 175 of the centrifugal pendulum 130. The pendulum flange 170 is bent axially in a radially outer area, and in that area rests against an axial end of the elastic element 160. The holding element 305 is preferably attached or formed in the radially outer area of the turbine wheel 145, and may be integrated with the controllable friction clutch 155. The holding element 305 is preferably set up to support the elastic element 160 on a radial outer side.

Figure 6:
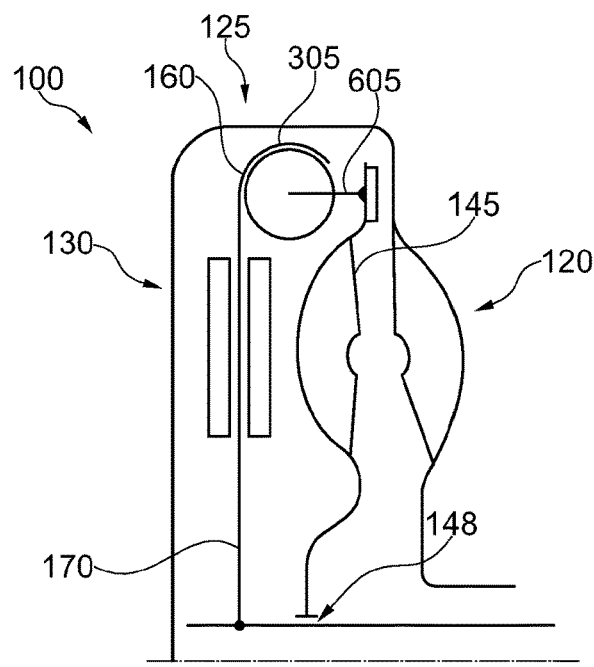

FIG. 6 shows the device 100 in a sixth embodiment. In contrast to the fifth embodiment, here the holding element 305 is attached to or formed on the pendulum flange 170 of the centrifugal pendulum 130. For axial contact with the elastic element 160 of the spring damper 125, a transfer element 605 may be provided which is connected to the turbine wheel 145. The transfer element 605 may in particular be integrated with the turbine wheel 145, and may for example be bent out in the axial direction.

Figure 7:
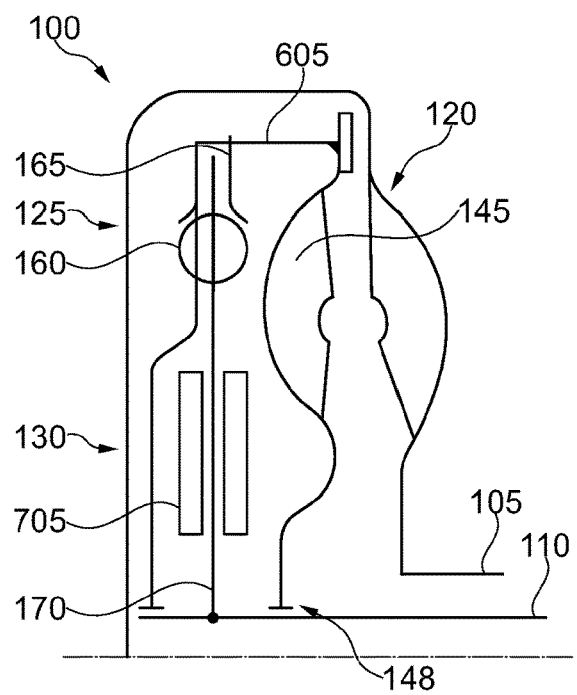

FIG. 7 shows the device 100 in a seventh embodiment. In contrast to embodiments five and six, here the pendulum flange 170 and the spring damper 125 are aligned with each other. The elastic element 160 is preferably in contact axially with a section of the pendulum flange 170. An additional axial contact is formed by a transfer flange 705, which extends radially inward and is preferably supported radially relative to the output side 110. A transfer of power between the turbine wheel 145 and the transfer flange 705 preferably takes place on a radial outer side of the elastic element 160 by means of the transfer element 605. The transfer element 605 and the transfer flange 705 may engage with each other frictionally or may be connected to each other non-positively in some other way. In the depicted, preferred embodiment, an additional auxiliary flange 165 is provided, which is located axially opposite the transfer flange 705 in an area radially outside of the elastic element 160. Preferably lift flaps are provided on the transfer flange 705, and possibly also on the auxiliary flange 165, in order to brace the elastic element 160 radially on the outside.

Figure 8:
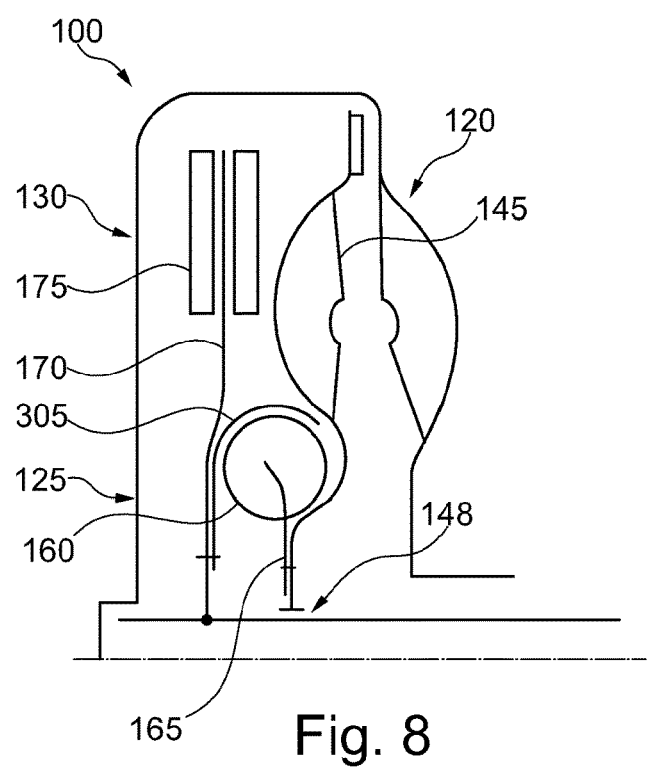

FIG. 8 shows the device 100 in an eighth embodiment. Similarly to embodiments two through four, the spring damper 125 is located radially inside of an area of the pendulum mass 175. A holding element 305 for radially outer bracing of the elastic element 160 is fastened non-positively to the pendulum flange 170 of the centrifugal pendulum 130, for example by means of rivets. An auxiliary flange 165 for axial contact with the elastic element 160 is preferably connected non-positively to the turbine wheel 145 on a radially inner side of the elastic element 160.

REFERENCE LABELS 100 device for transmitting torque
105 input side
110 output side
115 axis of rotation
120 hydrodynamic converter
125 spring damper
130 centrifugal pendulum
135 pump wheel
140 housing
145 turbine wheel
148 Hub
150 hydraulic fluid
155 friction clutch
160 elastic element
165 intermediate flange
170 pendulum flange
175 pendulum mass
180 pendulum element
305 holding element
405 Hub
605 transfer element
705 transfer flange

The invention claimed is:

1. A device for transmission of torque between an input side and an output side, the device comprising:
   a hydrodynamic converter having a pump wheel connected to the input side and a turbine wheel coupled hydrodynamically with the pump wheel via a fluid,
   a spring damper for coupling the turbine wheel with the output side,
   a centrifugal pendulum connected to the spring damper and including a pendulum mass movably attached to a pendulum flange,
   the spring damper being a sole spring damper positioned in a flow of torque between the input side and the output side,
   a first intermediate flange and a second intermediate flange configured for bracing the spring damper, wherein the first intermediate flange is arranged on a first axial side of the pendulum flange and the second intermediate flange is arranged on a second axial side of the pendulum flange, and
   a controllable friction clutch is connected to a radial outer side of the turbine wheel and configured for rigidly coupling the pump wheel with the turbine wheel.

2. The device as recited in claim 1 wherein the centrifugal pendulum is rigidly connected to the output side.

3. The device as recited in claim 1 further including a housing to receive the turbine wheel, the spring damper, the centrifugal pendulum and the fluid.

4. The device as recited in claim 1 wherein the spring damper is positioned radially inside of the pendulum mass of the centrifugal pendulum.

5. The device as recited in claim 1 wherein the pendulum flange of the centrifugal pendulum and the spring damper are aligned with each other axially.

6. The device as recited in claim 1, wherein the turbine wheel is braced radially on a radial inner side by a hub.

7. The device as recited in claim 1, wherein the spring damper comprises a cylindrical coil spring.

8. The device as recited in claim 1, wherein the first intermediate flange and the second intermediate flange are rigidly joined with each other.

9. The device as recited in claim 1, wherein the pendulum mass comprises a first pendulum element and a second pendulum element positioned on different axial sides of the pendulum flange.

* * * * *